(12) United States Patent
Rudy et al.

(10) Patent No.: US 11,130,658 B2
(45) Date of Patent: Sep. 28, 2021

(54) OPTICAL DETECTION AND ANALYSIS OF A COUNTERWEIGHT ASSEMBLY ON A CRANE

(71) Applicant: Manitowoc Crane Companies, LLC, Manitowoc, WI (US)

(72) Inventors: John R. Rudy, Greencastle, PA (US); Matthew Thoresen, Chambersburg, PA (US)

(73) Assignee: Manitowoc Crane Companies, LLC, Manitowoc, WI (US)

(*) Notice: Subject to any disclaimer, the term of this patent is extended or adjusted under 35 U.S.C. 154(b) by 0 days.

(21) Appl. No.: 15/819,234

(22) Filed: Nov. 21, 2017

(65) Prior Publication Data
US 2018/0141788 A1 May 24, 2018

Related U.S. Application Data

(60) Provisional application No. 62/425,449, filed on Nov. 22, 2016.

(51) Int. Cl.
B66C 13/16 (2006.01)
B66C 13/46 (2006.01)
(Continued)

(52) U.S. Cl.
CPC .............. B66C 13/16 (2013.01); B66C 13/18 (2013.01); B66C 13/46 (2013.01); B66C 13/48 (2013.01);
(Continued)

(58) Field of Classification Search
CPC ......... B66C 13/16; B66C 13/18; B66C 23/72; B66C 23/74; B66C 23/76; B66C 23/88; B66C 13/46
(Continued)

(56) References Cited

U.S. PATENT DOCUMENTS 4,216,868 A 8/1980 Geppert
4,577,344 A 3/1986 Warren et al.
(Continued)

FOREIGN PATENT DOCUMENTS

AU 637377 B 10/1993
AU 2015372216 A1 7/2016
(Continued)

OTHER PUBLICATIONS

European Search Report issued by ISA/EPO in connection with EP17153446 dated Jul. 7, 2017.
(Continued)

Primary Examiner — Dean O Takaoka
(74) Attorney, Agent, or Firm — Klintworth & Rozenblat IP LLP

(57) ABSTRACT

An optical detection system for a crane having a counterweight assembly includes an image capture assembly having one or more image capture devices configured to capture an image of the counterweight assembly and an optical control system. The optical control system is configured to detect one or more objects in the captured image, the one or more objects selected from the counterweight assembly, a weight unit of the counterweight assembly, a stack of weight units of the counterweight assembly, and a marker on the counterweight assembly. The optical control system is also configured to analyze the one or more detected objects and determine a status of counterweight assembly based on the analysis of the one or more detected objects.

19 Claims, 6 Drawing Sheets

(51) Int. Cl.
| | |
|---|---|
| *B66C 23/76* | (2006.01) |
| *B66C 23/36* | (2006.01) |
| *B66C 15/06* | (2006.01) |
| *G06T 7/00* | (2017.01) |
| *G06T 7/73* | (2017.01) |
| *G06T 7/13* | (2017.01) |
| *B66C 13/18* | (2006.01) |
| *G06T 7/60* | (2017.01) |
| *G06T 7/70* | (2017.01) |
| *G01B 11/26* | (2006.01) |
| *B66C 13/48* | (2006.01) |
| *B66C 23/42* | (2006.01) |
| *B66C 13/06* | (2006.01) |

(52) U.S. Cl.
CPC ............ *B66C 15/06* (2013.01); *B66C 15/065* (2013.01); *B66C 23/36* (2013.01); *B66C 23/42* (2013.01); *G01B 11/26* (2013.01); *G06T 7/0004* (2013.01); *G06T 7/13* (2017.01); *G06T 7/60* (2013.01); *G06T 7/70* (2017.01); *G06T 7/74* (2017.01); *B66C 13/06* (2013.01); *G06T 2207/30164* (2013.01); *G06T 2207/30204* (2013.01); *G06T 2207/30242* (2013.01)

(58) Field of Classification Search
USPC .................................................. 212/195, 279
See application file for complete search history.

(56) References Cited

U.S. PATENT DOCUMENTS

| | | | |
|---|---|---|---|
| 4,826,391 A | 5/1989 | Lawrence et al. | |
| 4,907,768 A * | 3/1990 | Masseron ............ | B66F 11/048 212/197 |
| 5,251,768 A | 10/1993 | Yoshimatsu et al. | |
| 5,392,935 A | 2/1995 | Kazama et al. | |
| 5,642,822 A | 7/1997 | Monzen et al. | |
| 5,645,181 A | 7/1997 | Ichiba et al. | |
| 5,726,907 A | 5/1998 | Davidson et al. | |
| 5,967,347 A | 10/1999 | Miyata et al. | |
| 6,065,619 A | 5/2000 | Miyata et al. | |
| 6,140,930 A | 10/2000 | Shaw | |
| 6,170,681 B1 | 1/2001 | Yoshimatsu | |
| 6,182,843 B1 | 2/2001 | Tax et al. | |
| 6,256,553 B1 | 7/2001 | Erikkila | |
| 6,549,139 B2 | 4/2003 | Shaw, Jr. | |
| 6,554,144 B2 | 4/2003 | Hashiguchi et al. | |
| 6,568,547 B1 * | 5/2003 | Kretschmer ............ | B66C 23/76 212/196 |
| 6,588,610 B2 | 7/2003 | Ong et al. | |
| 6,634,112 B2 | 10/2003 | Carr et al. | |
| 6,718,048 B1 | 4/2004 | Kawata et al. | |
| 6,748,104 B1 | 6/2004 | Bachelder et al. | |
| 6,765,224 B1 | 7/2004 | Favreau et al. | |
| 6,894,621 B2 | 5/2005 | Shaw | |
| 7,106,883 B2 | 9/2006 | Uchida et al. | |
| 7,121,012 B2 | 10/2006 | Voecks | |
| 7,289,875 B2 | 10/2007 | Recktenwald et al. | |
| 7,289,876 B2 | 10/2007 | Lussen et al. | |
| 7,310,431 B2 | 12/2007 | Gokturk et al. | |
| 7,472,009 B2 | 12/2008 | Baldwin | |
| 7,599,762 B2 | 10/2009 | Discenzo et al. | |
| 7,648,036 B2 | 1/2010 | Recktenwald et al. | |
| 7,656,459 B2 | 2/2010 | Catanzaro | |
| 7,936,143 B2 | 5/2011 | Ikeguchi et al. | |
| 7,950,539 B2 | 5/2011 | Henriksson | |
| 8,005,598 B2 | 8/2011 | Terashima et al. | |
| 8,267,264 B2 | 9/2012 | Bryfors et al. | |
| 8,272,521 B1 | 9/2012 | Kemmerly et al. | |
| 8,385,594 B2 | 2/2013 | Hofmann et al. | |
| 8,504,253 B2 | 8/2013 | Stantchev et al. | |
| 8,618,949 B2 | 12/2013 | Maynard et al. | |
| 8,659,408 B2 | 2/2014 | Taylor et al. | |
| 8,682,541 B2 | 3/2014 | Best et al. | |
| 8,937,651 B2 | 1/2015 | Guissin et al. | |
| 9,156,663 B2 * | 10/2015 | Roeben ................ | B66C 15/06 |
| 9,278,834 B2 * | 3/2016 | Pech .................... | B66C 23/76 |
| 9,300,954 B2 | 3/2016 | Tanizumi et al. | |
| 9,335,318 B2 | 5/2016 | Ilaka et al. | |
| 9,394,146 B2 | 7/2016 | Schroder | |
| 9,440,824 B2 * | 9/2016 | Stuehrwoldt ........ | B66C 23/76 |
| 9,556,006 B2 | 1/2017 | Schneider et al. | |
| 2003/0137590 A1 | 7/2003 | Barnes et al. | |
| 2003/0161524 A1 | 8/2003 | King | |
| 2005/0192732 A1 | 9/2005 | Narisawa et al. | |
| 2005/0226584 A1 | 10/2005 | Williams et al. | |
| 2005/0232626 A1 | 10/2005 | Schulte et al. | |
| 2010/0070179 A1 | 3/2010 | Cameron | |
| 2010/0189226 A1 | 7/2010 | Kotowski et al. | |
| 2010/0277298 A1 | 11/2010 | Leong et al. | |
| 2011/0031202 A1 * | 2/2011 | Pech .................... | B66C 23/76 212/178 |
| 2011/0140419 A1 | 6/2011 | Stockner | |
| 2011/0187548 A1 | 8/2011 | Maynard et al. | |
| 2011/0272376 A1 | 11/2011 | Jung et al. | |
| 2013/0013251 A1 * | 1/2013 | Schoonmaker ........ | B66C 13/46 702/152 |
| 2013/0119256 A1 | 5/2013 | Husmann et al. | |
| 2013/0345857 A1 | 12/2013 | Lee et al. | |
| 2014/0224755 A1 | 8/2014 | Eriksson et al. | |
| 2015/0122761 A1 | 5/2015 | Ford et al. | |
| 2015/0130375 A1 | 5/2015 | Sutherland | |
| 2015/0142277 A1 | 5/2015 | Eriksson et al. | |
| 2015/0217455 A1 | 8/2015 | Kikkeri et al. | |
| 2015/0226369 A1 | 8/2015 | Troy et al. | |
| 2015/0256797 A1 | 9/2015 | Torben | |
| 2015/0329333 A1 | 11/2015 | Fenker | |
| 2015/0344271 A1 | 12/2015 | Schneider et al. | |
| 2016/0006947 A1 * | 1/2016 | Kowatari ............. | B60R 1/00 348/148 |
| 2016/0016763 A1 | 1/2016 | Lee et al. | |
| 2016/0031681 A1 | 2/2016 | Delplace | |
| 2016/0031683 A1 | 2/2016 | Fenker et al. | |
| 2016/0035251 A1 | 2/2016 | Delplace | |
| 2016/0107866 A1 * | 4/2016 | Schoonmaker ........ | B66C 13/46 701/50 |
| 2016/0119589 A1 | 4/2016 | Tanizumi et al. | |
| 2016/0176686 A1 | 6/2016 | Schoonmaker | |
| 2016/0236913 A1 | 8/2016 | Ilaka et al. | |
| 2017/0217737 A1 | 8/2017 | Rudy et al. | |
| 2018/0044149 A1 | 2/2018 | Weckbecker et al. | |
| 2018/0072540 A1 | 3/2018 | Stangl | |
| 2018/0141787 A1 * | 5/2018 | Rudy .................... | B66C 13/18 |
| 2018/0141789 A1 | 5/2018 | Rudy et al. | |
| 2018/0143011 A1 * | 5/2018 | Rudy .................... | B66C 13/18 |
| 2018/0209156 A1 | 7/2018 | Pettersson | |
| 2018/0252921 A1 | 9/2018 | Rantala et al. | |
| 2019/0112165 A1 | 4/2019 | Palberg et al. | |
| 2019/0270624 A1 | 9/2019 | Sembo | |
| 2019/0276281 A1 | 9/2019 | Hofmeister et al. | |

FOREIGN PATENT DOCUMENTS

| | | | | |
|---|---|---|---|---|
| CN | 2154484 Y | 1/1994 | | |
| CN | 102193559 A | 9/2011 | | |
| CN | 102661952 A | 9/2012 | | |
| CN | 102795547 A | 11/2012 | | |
| CN | 103398668 A | 11/2013 | | |
| CN | 203319435 U | 12/2013 | | |
| CN | 102756976 B | 7/2014 | | |
| CN | 104477723 A | 4/2015 | | |
| CN | 104535356 A | 4/2015 | | |
| CN | 105668419 A | 6/2016 | | |
| DE | 102006046469 A1 | 4/2008 | | |
| DE | 102006046469 A1 * | 4/2008 | ............ | B66C 23/74 |
| DE | 102013008348 A1 | 11/2014 | | |
| DE | 102013008348 A1 * | 11/2014 | ............ | B66C 23/36 |
| DE | 102014018063 A1 | 6/2016 | | |
| EP | 2383566 A1 | 11/2011 | | |
| EP | 2722302 A1 | 4/2014 | | |
| EP | 2914540 B1 | 9/2015 | | |

(56) References Cited

FOREIGN PATENT DOCUMENTS

| | | | |
|---|---|---|---|
| EP | 2899496 | A1 | 8/2016 |
| JP | 2056397 | A | 2/1990 |
| JP | H0256397 | A | 2/1990 |
| JP | H08157188 | A | 6/1996 |
| JP | 2003300692 | A | 10/2003 |
| JP | 2008074594 | A | 4/2008 |
| JP | 2009073248 | A | 4/2009 |
| JP | 2010241548 | A | 10/2010 |
| JP | 2013120176 | A | 6/2013 |
| JP | 2013193825 | A | 9/2013 |
| JP | 2015101470 | A | 6/2015 |
| JP | 2015229582 | A | 12/2015 |
| JP | 2016166086 | A | 9/2016 |
| JP | 2016166091 | A | 9/2016 |
| JP | 2017186163 | A | 10/2017 |
| JP | 2017186164 | A | 10/2017 |
| JP | 2017186165 | A | 10/2017 |
| WO | 9119665 | A1 | 2/1991 |
| WO | 1999008956 | A1 | 2/1999 |
| WO | 2004080882 | A1 | 9/2004 |
| WO | 2009047719 | A2 | 4/2009 |
| WO | 2013059599 | A1 | 4/2013 |
| WO | 2014019132 | A1 | 2/2014 |
| WO | 2014047840 | A1 | 4/2014 |
| WO | 2016101500 | A1 | 6/2016 |
| WO | 2017067651 | A1 | 4/2017 |
| WO | 2017159321 | A1 | 9/2017 |
| WO | 2018160119 | A1 | 9/2018 |

OTHER PUBLICATIONS

"360 degree vehicle camera systems", https://www.vdo-instruments.com/camera-systems/360-degree-vehicle-camera-systems.html, captured Oct. 9, 2017.

"ProViu ASL 360", http://www.asl360.co.uk/products/, captured Oct. 9, 2017.

Extended European Search Report issued by EPO in connection with EP17203098 dated Apr. 17, 2018.

Extended European Search Report issued by EPO in connection with EP17203102 dated Apr. 18, 2018.

Extended European Search Report issued by EPO in connection with EP17203093 dated Apr. 18, 2018.

Extended European Search Report issued by EPO in connection with EP17203109 dated May 4, 2018.

Vallan A, Molinari F. A vision-based technique for lay length measurement of metallic wire ropes. IEEE Trans Instrum Meas 2009; 58. (Year: 2009).

Extended European Search Report issued by EPO in connection with EP Appl. 19207783.2 dated Mar. 31, 2020.

Communication under Rule 71(3) EPC indicating Intention to Grant issued by EPO in connection with corresponding EP Appl. 17 203 098.3 dated Jun. 25, 2020.

* cited by examiner

OPTICAL DETECTION AND ANALYSIS OF A COUNTERWEIGHT ASSEMBLY ON A CRANE

BACKGROUND

The following description relates to the detection and analysis of a counterweight assembly, and in particular, the optical detection and analysis of the counterweight assembly to determine a status of the counterweight assembly.

A crane, such as a mobile crane, typically includes a lower works, or carrier, and an upper works, or superstructure, mounted on the lower works. The lower works includes, for example, a frame, a suspension mounted to the frame, tires mounted to the suspension, and one or more outriggers each having an arm selectively extendable and retractable in a substantially horizontal direction and a jack coupled to the arm selectively extendable and retractable in a substantially vertical direction. The upper works may be rotatably mounted on the lower works to rotate about a vertical axis. The upper works may include, for example, a boom, an operator cab, a counterweight assembly and a hoist for winding and unwinding a rope. The upper works also includes a rotating bed on which the above-noted components are mounted. The hoist is typically mounted at or near a base of the upper works, such as the rotating bed. The rope may extend outward from the hoist, generally along the boom, and hang freely from the tip of the boom. A hook block is typically disposed at a free end of the rope for engaging a load.

The crane is capable of performing a number of movements. For example, the upper works, including the boom, may swing left or swing right (i.e., rotate on the vertical axis counterclockwise or clockwise), the boom may lift up or down (i.e., increase or decrease an angle relative to the horizontal), and the boom may extend or retract telescopically.

Various crane components, including those described above, may be monitored to determine a status of the crane component. Typically, sensors such as proximity sensors, load cells, RFID sensors and the like may be used to detect a crane component. For example, a proximity sensor may detect whether an outrigger is in a fully extended or retracted condition or whether a counterweight is properly positioned condition. Some crane components may be visually detected as well, for example, by the operator or a spotter.

Crane components may also be monitored to determine a service condition and whether a particular component needs to be replaced, repaired or otherwise maintained. Such monitoring may take place at predetermined time intervals or at a predetermined number of service hours. This monitoring may be carried out, for example, by visual inspection of the components.

A particular crane component that requires monitoring is the counterweight assembly. Counterweights may be fixed, movable, removable, configurable, reconfigurable and/or repositionable. The position, configuration and specifications of the counterweight assembly affect a maximum load which may be lifted by the crane.

Currently, the position, configuration and specifications of the counterweight assembly may be monitored visually by an operator, spotter or service technician. The position of the counterweight assembly may also be determined by using a proximity switch or similar sensor. However, manual or visual inspection of the counterweight may be time consuming, costly, and may be subjective or inaccurate. In addition, sensors may fail or become less reliable over time due to regular wear.

Accordingly, it is desirable to provide an image-based counterweight assembly detection and analysis system capable of detecting and determining a status of the counterweight assembly, such as a configuration, a position and a specification of the counterweight assembly.

SUMMARY

According to one aspect, a crane includes a carrier, a superstructure coupled to the carrier, the superstructure including a boom, a counterweight assembly, and an optical detection system. The optical detection system includes an image capture assembly having one or more image capture devices configured to capture an image of the counterweight assembly and an optical control system. The optical control system is configured to detect one or more objects in the captured image, the one or more objects selected from: the counterweight assembly, a weight unit of the counterweight assembly, a stack of weight units of the counterweight assembly, and a marker on the counterweight assembly. The optical control system is further configured to analyze the one or more detected objects, and determine a status of the counterweight assembly based on the analysis of the one or more detected objects.

According to another aspect, an optical detection system for a crane having a counterweight assembly includes an image capture assembly having one or more image capture devices configured to capture an image of the counterweight assembly and an optical control system. The optical control system is configured to detect one or more objects in the captured image, the one or more objects selected from: the counterweight assembly, a weight unit of the counterweight assembly, a stack of weight units of the counterweight assembly, and a marker on the counterweight assembly. The optical control system is further configured to analyze the one or more detected objects and determine a status of the counterweight assembly based on the analysis of the one or more detected objects.

According to another aspect, a method of determining a status of a crane component includes capturing, with an image capture assembly, an image of a counterweight assembly on a crane, and detecting, with an optical control system, one or more objects in the captured image, wherein the one or more objects include one or more of: the counterweight assembly, a weight unit of the counterweight assembly, a stack of weight units of the counterweight assembly, and a marker on the counterweight assembly. The method further includes analyzing, with the optical control system, the detected objects, and determining, with the optical control system, a status of the counterweight assembly based on the analysis of the detected objects.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
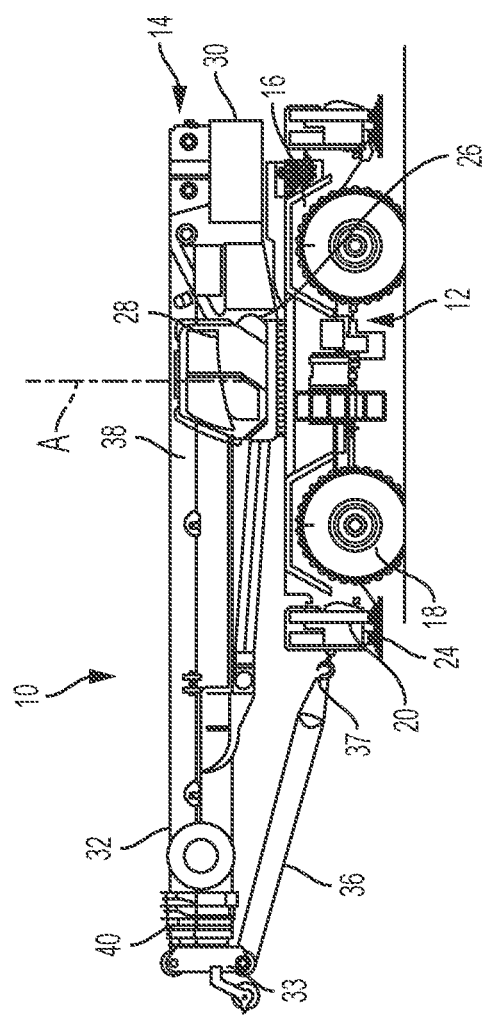
FIG. 1 is a side view of a crane according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
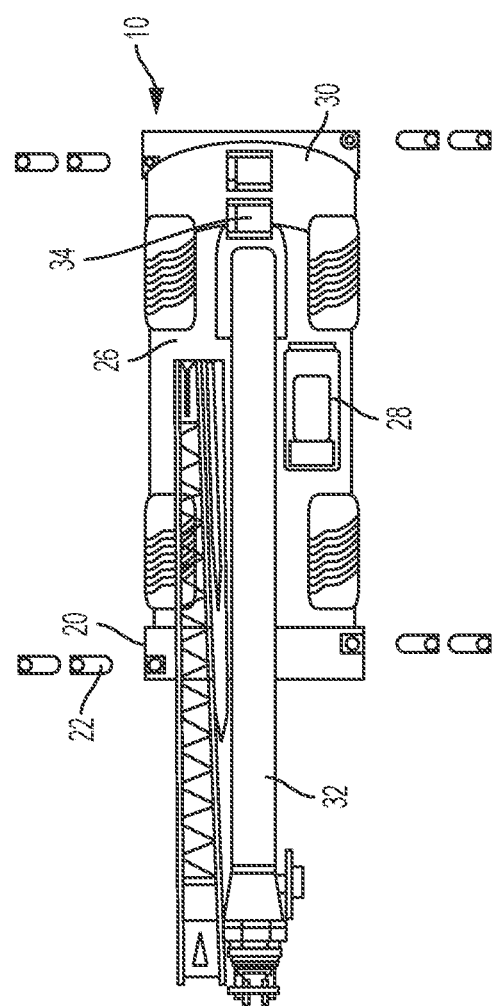
FIG. 2 is a top view of the crane of FIG. 1.

FIG. 1 is a side view of a crane 10 according to an embodiment described herein and FIG. 2 is a top view of the crane 10 in FIG. 1. Referring to FIGS. 1 and 2, the crane 10 may be a mobile crane, such as, but not limited to, a rough terrain crane, an all-terrain crane, a truck mounted crane or an industrial crane. The crane 10 generally includes a carrier, or lower works, 12 and a superstructure, or upper works, 14. In one embodiment, the carrier 12 may include various crane components, for example, a frame 16, a plurality of ground engaging elements 18 such as tires, and a suspension (not shown) interconnected between the frame 16 and the ground engaging elements 18. The carrier 12 may also include other crane components such as one or more outrigger assemblies 20. In one embodiment, each outrigger assembly 20 includes a jack 22 that is movable generally in a vertical direction to engage and disengage the ground or other support surface. Each outrigger assembly 20 may also include an arm 24 that is movable generally in a horizontal direction to extend toward and away from the frame 16. In one embodiment, the arm 24 is a telescoping arm having a fixed section, such as an outrigger box, and one or more telescoping sections movable relative to the fixed section. Each jack 22 may be mounted to a respective arm 24.

The superstructure 14 is coupled to the carrier 12. In one embodiment, the superstructure 14 is rotatably coupled to the carrier 12 and is configured to rotate relative to the carrier 12 about a vertical axis 'A' (see FIG. 1). In one embodiment, the superstructure 14 may also include crane components, for example, a rotating bed 26, an operator cab 28, a counterweight assembly 30, a boom 32, a hoist 34 for winding and unwinding a rope 36 and a hook block 37 connected to the rope 36. The counterweight assembly 30 may be similar to the counterweight assemblies shown and described in U.S. Pat. Nos. 9,440,824 and 9,394,146, both of which are commonly assigned with present application and incorporated herein in their entireties.

In one embodiment, the boom 32 may be a telescoping boom, such as a hydraulic telescoping boom. The boom 32 may include a base section 38 and one or more nested, telescoping sections 40 configured for telescoping extension and retraction relative to the base section 38. The one or more telescoping sections 40 may be driven, for example, by a linear actuator (not shown). The rope 36 may extend from the hoist 34 generally along the boom 32, and extend from a boom tip 33. The hook block 37 is connected to the rope 36 at a distal end of the rope 36, opposite to the hoist 34.

It is understood that present disclosure is not limited to mobile cranes of the type described above. For example, the crane 10 may be a crawler crane, a tower crane or other lifting device having a counterweight assembly. For example, in a tower crane, the lower works, or carrier may be in the form of a tower, and the upper works, or superstructure may be coupled to the top of the tower. The boom may be formed as a jib on the superstructure. The counterweight assembly may be secured to the superstructure or at a base of the crane, and connected to the superstructure using a suitable connection, such as a cable or tension line.

Figure 3:
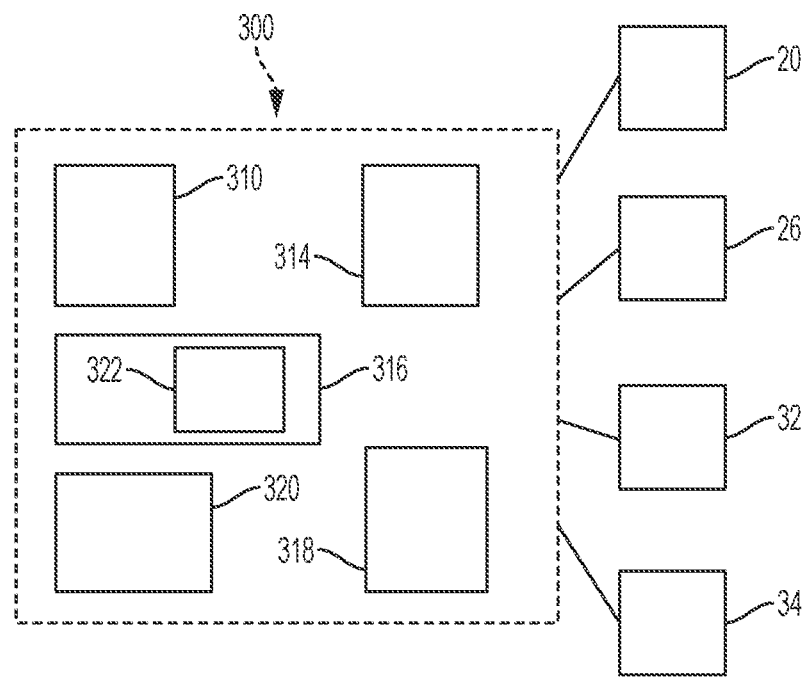
FIG. 3 is a block diagram of a crane control system according to an embodiment.

Referring to FIG. 3, the crane 10 may also include a crane control system 300. The crane control system 300 may include one or more input devices 310, such as an operating knob, lever, switch, touch screen input, and the like, configured to receive an input from an operator. The one or more input device 310 are operably connected to an actuator (not shown) configured to control movement of a crane component in response to an input received at the input device 310. For example, the one or more input devices 310 may receive an input to control slewing movement of the boom 32 and rotating bed 26, lifting (luffing) movement of the boom 32, telescoping movement (extension/retraction) of the boom 32, winding or winding of the rope 36 on the hoist 34, or movement of an outrigger assembly 20. In response to receiving the input, the actuator (not shown) may be actuated to control movement of the boom 32, hoist 34, outrigger 20 or other crane component in the desired manner. The actuator may be, for example, a linear actuator, rotary actuator, drive motor and other suitable actuators known to those having skill in the art.

In one embodiment, the crane control system 300 may include a computer processor 314, computer readable storage medium 316, a user interface 318 which may include the one or more input devices 310, and a communications interface 320. The crane control system 300 may be located in the cab 28 or remote from the cab 28. In some embodiments, components of the crane control system 300 may be distributed in different sections of the crane 10 or on devices remote from the crane 10. The computer readable storage medium 316 is operably coupled to the computer processor 314 such that it is able to communicate with the computer processor 314. The computer readable storage medium 316 stores instructions 322 that, when executed by the computer processor 314, cause the computer processor 314 to generate one or more signals to implement, or perform, functions. The computer readable storage medium 316 may also store information related to the operation of the crane 10. The user interface 318 is operably coupled to the computer processor 314 such that an operator is able to interact with computer processor 314. For example, through the user interface 318 the operator may obtain information related to the crane 10 operation and cause the computer processor 314 to generate one or more signals to implement a function. The operator may also input information to the user interface 314 or the one or more input devices 310 to cause the computer processor 314 to generate and transmit a control signal, via the communications interface 320, to the one or more of the actuators (not shown) to control or prevent movement of a crane component. In one embodiment, the instructions 322 stored at the computer readable storage medium 316 may be executed by the computer processor 314 in response to receipt of the input information from the user interface 318 such that a function is implemented by the computer processor 314 to transform the input information into the control signal.

Figure 4:
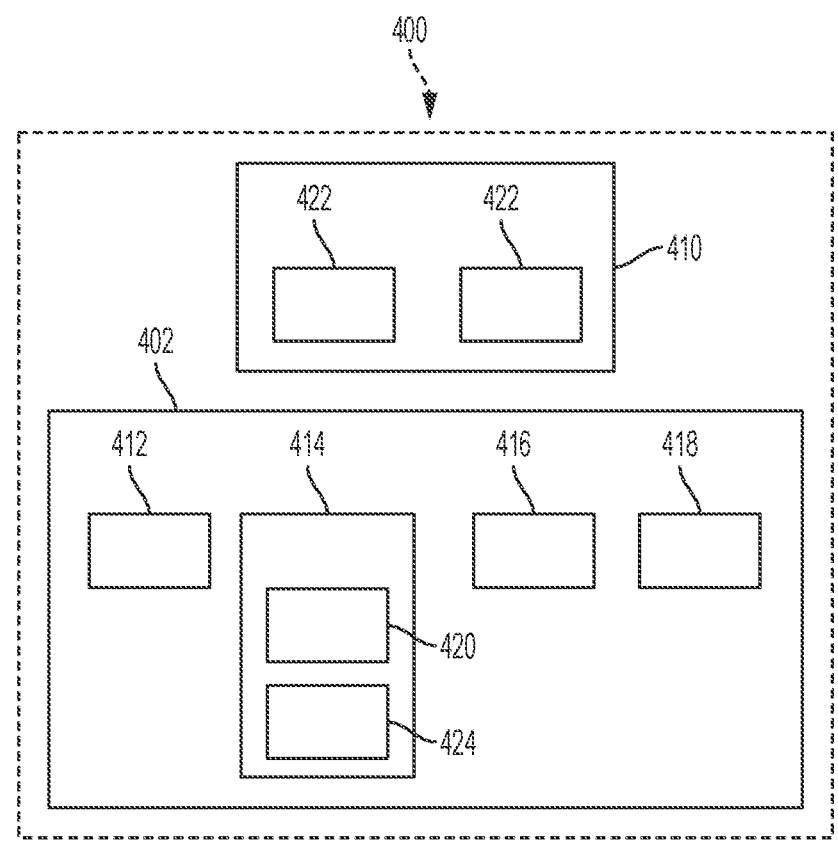
FIG. 4 is a block diagram of an optical detection system according to an embodiment.

Referring to FIG. 4, the crane 10 also includes an optical detection system 400. In one embodiment, the optical detection system 400 includes one or more image capture assemblies 410 and an optical control system 402 operably and communicably connected to the one or more image capture assemblies 410. The optical control system 402 includes a computer processor 412, a computer readable storage medium 414 and a communications interface 416, similar to those described above with respect to the crane control system 300. The optical control system 402 optionally includes a user interface 418, as well. The computer readable storage medium 414 stores instructions 420 that, when executed by the computer processor 412, cause the computer processor 412 to generate one or more signals to implement one or more functions. Alternatively, or in addition, the optical detection system 400 may be operably and communicably coupled to the crane control system 300, such that the optical detection system 400 and the crane control system 300 share one or more of a common computer processor, computer readable storage medium, user interface, and communications interface. In one embodiment, the optical control system 402 and the crane control system 300 may be one and the same. In one embodiment, components of the optical detection system 400 may be co-located with individual image capture assemblies 410, be located in a centralized location and communicably connected to the image capture assemblies 410 over a conventional communication interface, or be distributed among both.

Although certain processes, methods, analyses, calculations and/or determinations described herein may be referred as being carried out at one of the crane control system 300 or the optical detection system 400 (including the optical control system 402), it is understood that the present embodiments are not limited to these configurations. That is, the processes, methods, analyses, calculations and/or determinations described herein may, in some embodiments, be carried out interchangeably between, i.e., by either one of or both, the crane control system 300 and the optical detection system 400, even if a particular process, method, analysis, calculation or determination is not expressly described as such herein. Similarly, it is also understood that information, such as component specifications, sensor data and the like may be interchangeably input into either the crane control system 300 or the optical detection system 400.

For the purposes of consistency and understanding, the various methods, processes, analyses, calculations or determinations, as well as the input of various data or information, may be described herein as being carried out by, or input to, the optical detection system 400 or optical control system 402. However, as detailed above, the optical control system 400 and the crane control system 300 may share resources or components, operate interchangeably, or be one and the same. Accordingly, it is understood that the description herein of the methods, processes, analyses, calculations, determinations, including the input of data or information, being carried out by or input into the optical detection system 400 or optical control system 402, includes such processes, methods, analyses, calculations, determinations, or input of data or information, being carried out by or input to, the crane control system 300 as well.

In one embodiment, the one or more image capture assemblies 410 may be mounted, for example, on the superstructure 14, the carrier 12, or both. Suitable locations on the superstructure 14 for mounting the one or more image capture assemblies 410 include, but are not limited to, the rotating bed 26, the cab 28, the boom 32, the counterweight 30, or other intermediate or connecting structures between these components. Each image capture assembly 410 may include one or more image capture devices 422 configured for capturing an image across a desired field of view. In one embodiment, an image capture device 422 may be a camera, such as a digital camera, video camera, and/or a stereo camera, a LiDAR sensor, visible light camera, ultraviolet (UV) camera, infrared (IR) camera, and other suitable devices capable of capturing an image for object recognition. For example, in one embodiment, the image capture assembly 410 may be a single camera, such as a wide angle camera, or alternatively, a combination of cameras working in conjunction with one another to capture an image or images across the field of view.

The optical detection system 400 is configured to capture an image of one or more crane components, detect one or more crane components or other objects captured in the image, analyze the detected objects and determine a status of the crane component, a crane system, a crane or a series of cranes based on the captured image. The crane control system 300 may then alert the operator other personnel to the determined status and carry out crane control functions in response to the determined status. The alert may be provided, for example, as an audio, visual, or tactile (including vibratory) signal or alarm to the operator. Alternatively, or in addition, to carry out crane control functions, the crane control system 300 may generate a control signal to control an actuator, and in turn, movement of a desired crane components, based on the determined status.

The status could be, for example, an absolute position, a relative position, movement, existence, speed, acceleration, dimensions, and length of extension or retraction of a crane component. Other statuses include, for example, the type of component and a physical configuration of the component. Further, the status could be a service condition of the crane component, which may include, for example, indications of wear, damage or need for maintenance, repair or replacement of the component. It is understood that these examples are not exhaustive and the determination of other conditions are envisioned.

The optical detection system 400 may detect a crane component, and in some embodiments, determine a status of the crane component, using one or more detection methods, including but not limited to, one or more object recognition techniques. In some embodiments, the optical detection system 400 may analyze an image captured by the image capture assembly 410 to optically detect a crane component using optical recognition algorithms such as edge detection using brightness discontinuities. The optical recognition algorithms may be stored in the memory 414 and/or executed by the computer processor 412 at, for example, the optical control system 402 of the optical detection system 400. The optical detection system 400 may detect an edge or an end of a crane component using the above-noted edge detection and then, to determine a status, look up a position of the component based on the pixel location of the detected edge or end of the component. For example, in a field of view captured in an image, the optical control system 402 may be calibrated to assign a position or distance to one or more pixels in the captured image. Pixels associated with the detected edge or end of the crane component may then be compared to the positions or distances assigned to those pixels to determine a position or distance of the detected edge or end of the component.

Alternatively, or in addition, the computer readable storage medium 414 may have stored therein one or more stored images. The stored images may be captured in the same field of view as the captured image from the image capture assembly 400 and may have known objects identified therein. The captured image may then be compared to the stored image, for example, to detect the presence or absence of a particular component. Crane components may also be detected in manner described above. The optical detection system 400 may then analyze the captured image, for example, by comparing relative positions of detected objects in the captured image and the stored image or comparing relative conditions or appearances of the detected objects in the captured image and the stored image. The optical detection system 400 may then determine a status of the detected object based on the comparison. In such an embodiment, the image capture assembly 410 may be positioned to capture images of the object at views which closely correspond to the views at which the stored images were taken. Accordingly, accurate comparisons may be made between stored images or diagrams and captured images.

In other embodiments, the location of the end or an edge of the crane component may be calculated in real time based on the detected pixel location in the field of view of the image capture assembly 410. For example, if the end or edge of the crane component is determined to be at a particular angle relative to a centerline of the image capture assembly 410, then a table may give an extension corresponding to that particular angle. In other embodiments, the detected end or edge may be at a particular pixel location, which is then looked up on the chart to give an extension corresponding to that particular pixel location. In other embodiments, once the relative location of the crane component end or edge is detected, the physical length of the crane component may be calculated using commonly known techniques such as trigonometry or geometry.

Alternatively, or in addition, the optical detection system 400 may detect a visible target or marker 42 (see FIGS. 5 and 6) disposed on the crane component. Through such detection, the optical detection system 400 may analyze the marker 42 to determine a status of the crane component, for example, a position of the crane component, movement of the crane component, and/or the existence of the crane component. In one embodiment, the marker 42 may be horizontal lines, but other patterns may be used as well. In other embodiment, the marker 42 may be a color coating on a crane component, such as the counterweight assembly 30. The optical detection system 400 may detect the markers 42 using conventional pattern recognition algorithms. The pattern recognition algorithms may be stored in a memory and/or executed by a processor of the optical control system 402 of the optical detection system 400, and/or at the individual image capture assemblies 410. In one embodiment, a plurality of known markers may be stored in the computer readable storage medium 414, and a marker 42 captured in an image may be compared to the known markers. If the detected marker 42 is found to match a known marker, the optical detection system 400 may then identify the detected marker as corresponding to the known marker.

The optical detection system 400 may have stored therein, for example at the computer readable storage medium 414, additional information 424 associated with the known marker. Accordingly, when analyzing a detected marker 42, the optical detection system 400 may identify the detected marker 42 as corresponding to a known marker, retrieve the additional information 424 associated with the known marker, and associate the retrieved additional information with the detected marker 42. The additional information 424 may include, for example, position information or component-specific information, such as a type of component. Conversely, the optical detection system 400 may detect the absence of a marker 42 that was previously detected or expected to be detected, and determine a status based on the detected absence of the marker 42.

In each of these embodiments, when detecting objects in the captured image, the optical detection system 400 is configured to differentiate the crane component or marker 42 from the background in the image. In some embodiments, the target or marker 42 on the crane component may be a section that is coated with a special color and/or pattern to help differentiate the crane component from the background. For example, the crane component could have a fluorescent marker, a reflective marker, or other highly visible marker to increase contrast of the crane component relative to the background.

In one embodiment, a visible portion of the marker 42 may be captured in an image by the one or more image capture assemblies 410. The optical control system 402 may then convert the captured marker image 42 into a code representing the visible portion of the image. For example, if the marker 42 included five lines that were visible to and captured by the image capture assembly 410, the optical control system 402 may convert the image (i.e., the captured image of the marker 42) into a numeric code of five. The pattern may directly correspond to a measurement, e.g., each line could be one foot apart, or other predetermined unit of measurement, such that the numeric code is a direct measurement. In some embodiments, the numeric code may be compared to a table to look up information associated with the marker 42. In another embodiment, the marker 42 may be disposed at a location on the crane component that corresponds to qualitative or quantitative positions of the crane component. For example, when a marker 42 is moved into the field of view of the image capture assembly 410, the marker 42 may be detected by the optical detection system 400 and identified, for example, by a comparison to the stored markers as detailed above. The optical control system 402 may then identify and retrieve any additional information 424 that may be associated with the known marker 42 and associate the additional information with the detected marker 42.

Each of the aforementioned detection methods may be combined with other methods listed so as to aid, backup and/or give an alternate or redundant method of determining a status of the crane component. For example, the marker 42 may generally be used for measurements while end or edge detection of the crane component may be used to verify the measurement. In one embodiment, it is envisioned that if the marker 42 were obscured and the image capture assembly 410 missed a portion of the marker 42, the detected edge or end of the crane component may give a reading inconsistent with the captured, or detected, marker 42, and the optical detection system 400 may alert the operator to a possible problem.

Thus, in one embodiment, the optical detection system 400, and in particular, the optical control system 402, may detect various objects, such as a crane component and/or the marker 42 in a captured image using object recognition software, analyze the detected objects, and determine the status of the crane or a crane component based on the detected objects. The crane component for which a status is determined may be the detected crane component or a separate crane component. The object recognition software may be stored in the computer-readable storage medium 414. In one embodiment, the object recognition software is conventional, using conventional methods understood by those having ordinary skill in the art to detect or differentiate objects in a captured image or video. It is understood that the present disclosure is not limited to the object recognition techniques described herein, and that other known object recognition techniques or algorithms may be used.

Figure 5:
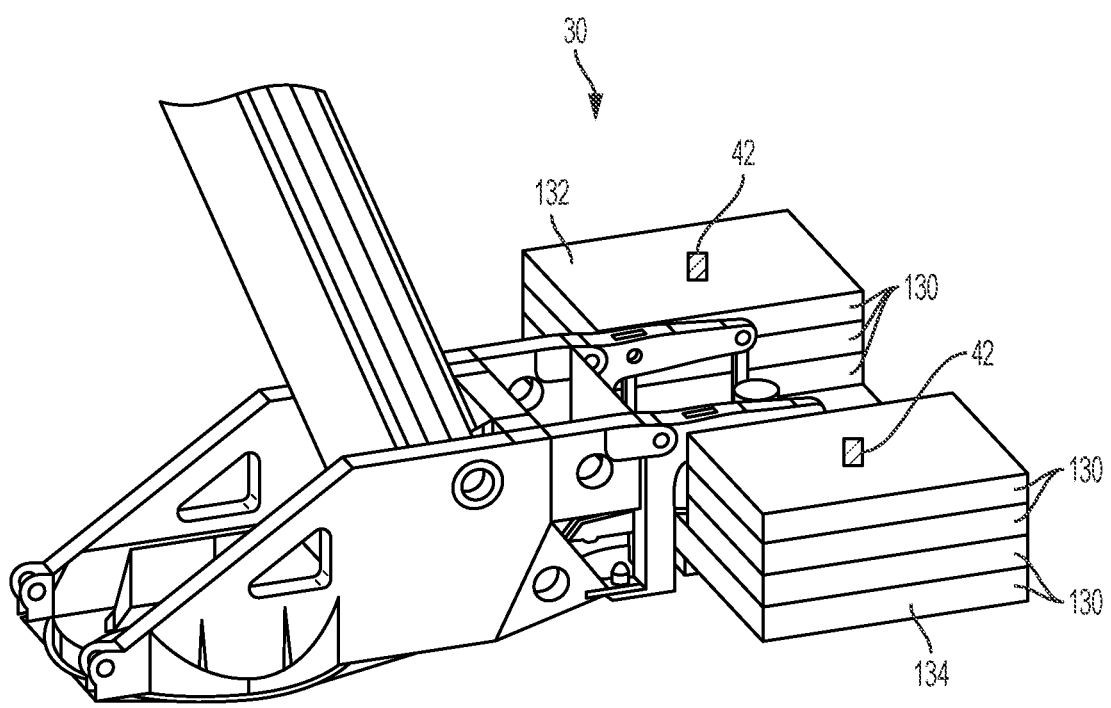
FIG. 5 illustrates an example of a counterweight assembly on a crane, according to an embodiment.
Figure 6:
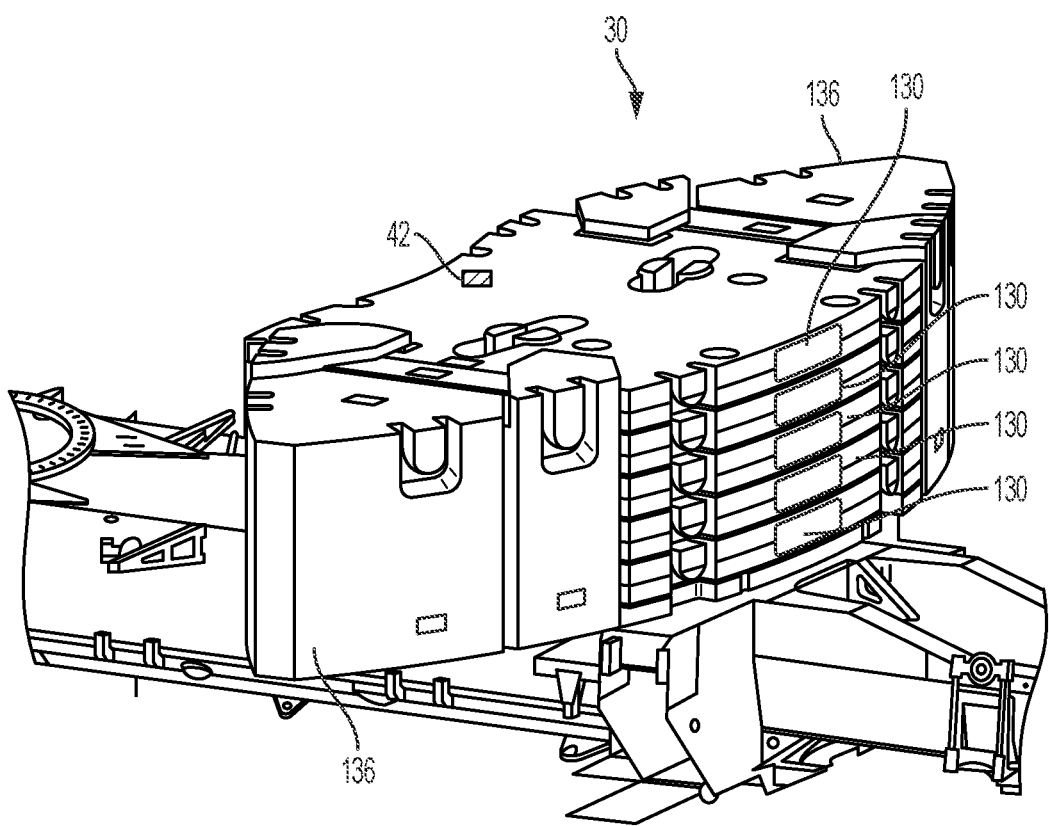
FIG. 6 illustrates another example of a counterweight assembly on a crane.

FIGS. 5 and 6 are perspective views showing examples of counterweight assemblies 30 which may be installed on the crane 10. The counterweight assemblies 30 in FIGS. 5 and 6 may be referred to herein collectively and interchangeably as "the counterweight assembly." It is understood that the counterweight assemblies 30 shown in FIGS. 5 and 6 are depicted for the purposes of example, and that the present disclosure is not limited to the the counterweight assemblies 30 of FIGS. 5 and 6.

Referring still to FIGS. 5 and 6, in one embodiment, the counterweight assembly 30 includes a plurality of weight units 130 which may be selectively added to and removed from the counterweight assembly 30 to increase or decrease the weight of the assembly 30 as desired. In addition, the counterweight assembly 30 may be movable or repositionable on the crane 10. For example, the counterweight assembly 30 may be moved linearly or pivoted on an axis relative to the carrier 12 or superstructure 14.

In one embodiment, such as that shown in FIG. 5, the counterweight assembly 30 may include a first counterweight stack 132 having one or more weight units 130 and a second counterweight stack 134 having one or more weight units 130. However, the present disclosure is not limited to such a configuration. It is understood that a counterweight stack may include multiple weight units 130 arranged in a vertical direction or multiple weight units 130 arranged in a horizontal direction. In another embodiment, a counterweight stack may be a single weight unit 130. In still another embodiment, the counterweight assembly 30 may be a single weight unit 130. In still another embodiment, the counterweight assembly may include only a single counterweight stack, as shown in FIG. 6, for example.

Accordingly, in some embodiments, a configuration of a counterweight assembly 30 may include one or more stacks 132, 134 of weight units 130. In addition, a configuration of the counterweight assembly 30 may be changed by adding or removing weight units 130. In one embodiment, the counterweight assembly 30 may include one or more weight wing weights 136. The counterweight assembly 30, in its entirety, may also be installed or removed from the crane 10. In addition, a position of the counterweight assembly 30, including positions of individual stacks 132, 134 of the counterweight assembly 30, may be changed. Changing the weight or position of the counterweight assembly 30 may change a maximum load capacity of the crane 10. Further, different counterweight assemblies 30 and individual weight units 130 may have different specifications, including but not limited to, different dimensions, weights, and product information.

Referring again to FIGS. 5 and 6, in one embodiment, the counterweight assembly 30 may be positioned in a field of view of the image capture assembly 410. Accordingly, the image capture assembly 410 is configured to capture an image, a series of images and/or a video of the counterweight assembly 30. The image capture assembly 410 may be mounted, for example, on the boom 32. In one embodiment, the image capture assembly 410 may be mounted on the base section 38 of the boom 32. In another embodiment, the image capture assembly 410 may be mounted on a telescoping section 40 of the boom 32. In still another embodiment, the image capture assembly 410 may be mounted on or in the operator cab 28. The present disclosure is not limited to these examples, however, and other suitable locations for mounting the image capture assembly 410 are envisioned. Such locations include those where the image capture assembly 410 may be mounted to have a field of view in which the counterweight assembly 30, and preferably a range of motion of the counterweight assembly 30, may be captured in an image taken by the image capture assembly 410.

The optical control system 402 is configured to detect one or more objects related to the counterweight assembly 30, analyze the detected objects and determine a status of the counterweight assembly 30. For example, in one embodiment, the optical control system 402 may detect a counterweight assembly 30, one or more individual weights 130, including wing weights 136, of the counterweight assembly 30, one or more stacks 132, 134 of a counterweight assembly 30 and a marker 42 on the counterweight assembly 30 or individual weight units 130. The optical control system 402 may detect the objects using one or more of the object recognition techniques detailed above. In one embodiment, the control system 402 may not detect any objects in the captured image, for example, when the counterweight assembly 30 is not installed on the crane 10.

The analysis carried out by the optical control system 402 may include, for example, identifying the detected objects, such as the counterweight assembly 30, a weight unit 130, a stack of weight units, or the marker 42. In one embodiment, the analysis may include detecting, for example, a shape, position or color of the detected object. The analysis may further include comparing the one or more detected objects in a captured image to one or more known objects in a stored image. The stored image may be stored, for example, in the computer readable storage medium 414. In one embodiment, the comparison may be a comparison of the shape, color or pattern of the detected object to a shape, color or pattern of the known object in the stored image. By comparing the one or more detected objects in the captured image to known objects in a stored image, the one or more detected objects may be identified as corresponding to a particular known object. Accordingly, a detected object may be identified as, for example, a counterweight assembly 30, an individual weight unit 130, or one or more markers 42.

In another example, a position of the detected object in the captured image may be compared to a position of a known object in a stored image. In one embodiment, the stored images are images taken from the same or substantially same viewing angle and have the same or substantially the same field of view as the captured image, so that the comparisons may be more readily made. The comparisons may be made, for example, by superimposing a captured image over a stored image, or comparing corresponding pixels between the captured and stored images. However, the comparisons are not limited to these techniques, and known techniques for comparing images may be used as well. In still another embodiment, the analysis may include, for example, counting pixels across the detected object or between reference points in the captured image.

The stored images may have additional information associated with the known objects therein, such as the counterweight assembly 30, a weight unit 130 or a marker 42. The additional information associated with the known objects in the stored image may include, for example and without being limited to, a weight, type, dimensions, position and identification information of the known objects.

As described above, the optical control system 402 may determine a status of the counterweight assembly 30 based on the analysis of the detected objects. The status may include, for example a configuration, position or specification of the counterweight assembly 30. In addition, the optical control system 402 may determine whether the counterweight assembly 30 is installed on the crane 10.

In one embodiment, the status may be determined by counting a number of identified objects in the captured image. The status may also be determined by retrieving, from the computer readable storage medium 414, the additional information associated with a known object, retrieving information from a stored table, and/or carrying out a calculation. The additional information may then be associated with the identified object in the captured image. Accordingly, when a detected object in a captured image is identified as matching a known object in a stored image, the optical control system 402 may retrieve the additional information associated with the known object and determine that the additional information corresponds to the detected object.

One status which may be determined by the optical control system 402 is a configuration of the counterweight assembly 30. Configurations of the counterweight assembly 30 which may be determined by the optical control system 402 include, but are not limited to, a number of stacks 132, 134 on the counterweight assembly 30, a number of weight units 130, including wing weights 136, on the counterweight assembly 30, and whether the counterweight assembly 30 is installed on the crane 10.

In one embodiment, each stack 132, 134 or weight unit 130, including wing weights 136, may include a marker 42, which may be detected and identified in a captured image as described above. The marker 42 may be identified by the optical control system 402 using the techniques described above. The optical control system 402 may then retrieve additional information associated with corresponding known marker and associate the retrieved information with the detected marker 42. The additional information may indicate the type of object on which the marker 42 is disposed, such as a stack 132, 134 or weight unit 130 of a counterweight assembly 30. In one embodiment, the optical control system 402 may count the number of detected stacks 132, 134 or weight units 130 to determine the number of stacks 132, 134 or weight units, respectively, in the counterweight assembly 30. Alternatively, the detected marker 42 may be identified by the optical control system 402 as a marker associated with a counterweight stack 132, 134 or weight unit 130 and the number of detected markers 42 may be counted to determine the number of stacks 132, 134 or weight units 130.

The optical control system 402 may identify a counterweight assembly 30 in its entirety in the captured image using the techniques described above, to determine a configuration of the counterweight assembly 30. For example, the optical control system 402 may retrieve the additional information related to a known counterweight weight assembly that has been found to match the detected counterweight assembly by way of a comparison between the captured image and one or more known images. The additional information may then be associated with the detected counterweight assembly 30. For example, the optical control system 402 may determine a number of stacks 132, 134 or a number of weight units 130 by comparing the detected counterweight assembly 30 in a captured image to known counterweight assemblies in one or more stored images. If the detected counterweight assembly 30 is found to match a known counterweight assembly in a stored image, additional information including, for example, a number of stacks or weight units in the known counterweight assembly may be retrieved and associated with the detected counterweight assembly 30. Thus, the optical control system 402 may determine a number of stacks or weight units, including wing weights, in the counterweight assembly 30 based in part on the additional information. In one embodiment, the optical control system 402 may detect the individual weight units 130, including wing weights 136 and/or stacks 132, 134, and count the detected number of the same to determine a configuration of the counterweight assembly 30. Alternatively, or in addition, the additional information may be retrieved by the optical control system 402 in response to identifying a detected marker 42 on the counterweight assembly 30 to determine a configuration of the detected counterweight assembly 30.

Further, the optical control system 402 may determine whether a counterweight assembly 30 is installed on the crane 10. For example, the optical control system 402 may analyze an image captured across a field of view in which an installed counterweight assembly 30 would be positioned. If no objects corresponding to counterweight assembly 30 are detected in the captured image, the optical control system 402 may determine that the counterweight assembly 30 is not installed on the crane 10. In another embodiment, the optical control system 402 may compare the captured image to one or more stored images having known counterweight assemblies. The comparison may find that captured image does not match any of the stored images, and based on such a finding, the optical control system 402 may determine that the counterweight assembly 30 is not installed. Conversely, if an object identified as a counterweight assembly 30 is detected in the captured image, or the captured image is determined to match a stored image based on a comparison, then the optical control system 402 may determine that the counterweight assembly 30 is installed on the crane 10.

Another status which may be determined by the optical control system 402 is a position of the counterweight assembly 30. The position may be determined either qualitatively or quantitatively. For example, a qualitative determination of the position may be a determination that the counterweight assembly 30 is suitably positioned for carrying out a desired lift or is not suitably positioned for carrying out desired lift. A quantitative determination of the position may be a determination of a distance the counterweight assembly 30 is spaced from a reference point or a position within a coordinate system.

For example, in one embodiment, the counterweight assembly 30 may be detected in a captured image and the position of the counterweight assembly 30 within the image may be identified. The identified positioning within the captured image may be expressed as, for example, pixel locations within the captured image. The captured image may be compared to one or more stored images having known counterweight assemblies, with the known counterweight assemblies in predetermined positions which may correspond to suitable positions for carrying out a desired lift with the crane 10. Thus, the position of the detected counterweight assembly 30 in the captured image may be compared to the position of a known counterweight assembly in a stored image. If the position of the detected counterweight assembly 30 matches a position of a known counterweight assembly in a suitable position, the optical detection system 402 may determine that the detected counterweight assembly 30 is in a position suitable for the crane 10 to carry out the desired lift. Conversely, if the position of the detected counterweight assembly 30 in the captured image does not correspond to position of a known counterweight assembly in the stored image, the optical control system 402 may determine that the detected counterweight assembly 30 is not in a suitable position for the crane 10 to carry out the desired lift.

In another embodiment, the position of the detected counterweight assembly 30 in the captured image may be compared to a position of known counterweight assemblies in stored images with the known counterweight assemblies in positions that are not suitable for carrying out the desired lift. Thus, if the position of the detected counterweight assembly 30 in the captured image matches a position of a known counterweight assembly in a stored image, the optical detection system 402 may determine that the detected counterweight assembly 30 is not suitably positioned for the crane 10 to carry out the desired lift. Conversely, if the position of the detected counterweight assembly 30 does not match a position of a known counterweight, the optical detection system 402 may determine that the counterweight assembly 30 is suitably positioned for the crane 10 to carry out the desired lift.

The optical control system 402 may also determine an actual position of a counterweight assembly 30 detected in a captured image. For example, the optical control system 402 may identify a position of the counterweight assembly 30 in the captured image. The optical control system 402 may then calculate an actual position of the counterweight assembly 30, for example, by using image scale information stored in the optical control system 402, for example, in a table. For instance, each pixel in the captured image may be associated with a distance measurement, or pixel locations in the captured image may be correspond to predetermined distances stored in the computer readable storage medium 414. Accordingly, an actual position of the counterweight assembly 30 may be determined for example, as a distance from a reference point or a position within a coordinate system.

The optical control system 402 is also configured to make position determinations based on the detection of one or markers 42 on the counterweight assembly 30, using the techniques for determining a position described above.

Still another status which may be determined by the optical control system 402 is a specification of the counterweight assembly 30. Such a specification may include, for example, dimensions, weight, and product information including type and identification information of the counterweight assembly 30 in its entirety, stacks 132, 134 of the counterweight assembly 30 and individual weight units 130. In one embodiment, a specification such as a weight or dimensions may be calculated. For example, a known weight for a weight unit 130 may be stored in the computer readable storage medium 414. By determining a number of weight units 130 as described above, the optical control system 402 may then calculate a total weight of a stack 132, 134 or the counterweight assembly 30. Dimensions may be calculated as well, for example, using stored scale information for the captured image.

In another embodiment, a specification may be stored as part of the additional information associated with a known object. Accordingly, when a detected object is identified, for example, using the techniques described herein, a specification may be retrieved from the additional information and associated with the detected and identified object in the captured image. For example, a detected counterweight assembly 30, an individual weight unit 130, or a stack of weight units in a captured image may be identified by way of a comparison to known objects in stored images or by identifying one or more markers 42. The additional information associated with the known objects may then be associated with the detected object when the detected object is identified as corresponding to a known object.

Figure 7:
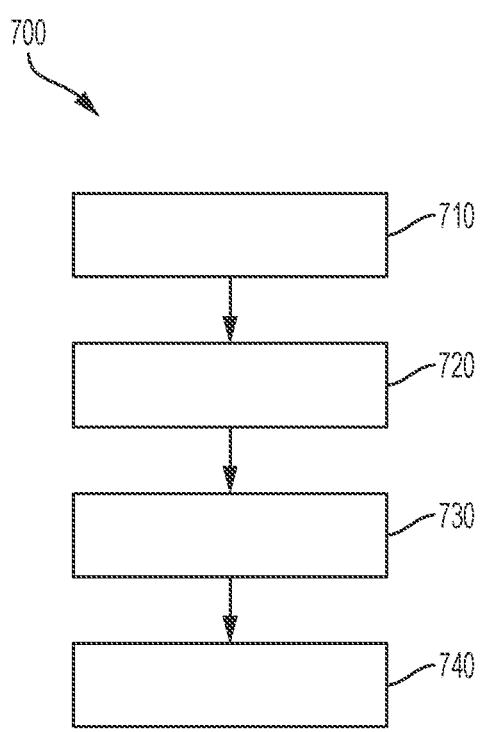
FIG. 7 is a block diagram showing a method of determining a status of a crane component, according to an embodiment.

FIG. 7 is a block diagram showing a method of determining a status of crane component 700, according to one embodiment. Referring to FIG. 7, the method may include capturing 710, with an image capture assembly, an image of a counterweight assembly on a crane, and detecting 720, with an optical control system 402, one or more objects in the captured image, wherein the one or more objects include one or more of: the counterweight assembly 30, a weight unit 130 of the counterweight assembly 30, a stack of weight units 130 of the counterweight assembly 30, and a marker 42 on the counterweight assembly. The method may further include analyzing 730, with the optical control system 402, the detected objects and determining 740, with the optical control system 402, a status of the counterweight assembly based on the analysis of the detected objects.

It is understood that although the embodiments above refer to a status being determined in response to one or more objects being detected in a captured image and analyzed by the optical control system 402, the determination of the status may also be made based on the absence of one or more objects being detected.

Accordingly, in the embodiments above, an image capture assembly may capture an image, or series of images, of a crane component or marker, and the images may be analyzed by the optical detection system 400 to determine a status of counterweight assembly 30. In some embodiments, the operator may be alerted to the status, the crane operations may be controlled or prevented, or both, in response to a determined status. In addition, the optical detection system 400 may detect a variety of different statuses. For example, with a captured image of a counterweight assembly 30, the optical detection system 400 may determine statuses relating to a configuration of the counterweight assembly 30, a position of the counterweight assembly 30 and a specification of the counterweight assembly 30.

In one embodiment, a load chart may be calculated, for example, by the crane control system 300. The load chart may be calculated based on the determined status(es) the counterweight assembly 30, such as the determined position and determined weight of the counterweight assembly 30. Thus, a maximum load (lifting) capacity of the crane 10 may be determined based on the status of counterweight assembly 30. Further, the crane control system 300 may control various crane components based on the maximum load capacity to prevent the crane 10 from entering an overload condition, where the load on the hook exceeds that maximum load capacity. For example, the crane control system 300 may block out operations that would move the boom 32 to a position where the load on the hook would exceed the maximum load capacity of the crane 10.

It is understood that the embodiments described herein may be used together with one another, and various features from one embodiment described herein may be used together with features in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A crane comprising:
a carrier;
a superstructure coupled to the carrier, the superstructure including a boom;
a counterweight assembly configured for movement or repositioning by linear movement or pivoting on an axis relative to the superstructure in a plurality of positions for different lifting operations on the crane, the counterweight assembly comprising one or more weight units;
an optical detection system comprising:
an image capture assembly comprising one or more image capture devices configured to capture an image of the counterweight assembly; and
an optical control system comprising a computer processor and a non-transitory computer-readable storage medium storing instructions, that when executed by the computer processor cause the optical control system to implement one or more functions to:
detect the counterweight assembly in the captured image;
analyze the detected counterweight assembly in the captured image; and
determine a status of the counterweight assembly based on the analysis of the detected counterweight assembly in the captured image, the determined status including a determined position of the counterweight assembly, wherein the determined position of the counterweight assembly is an actual position of the counterweight assembly calculated based on an identified position of the detected counterweight assembly in the captured image, the actual position determined quantitatively as a distance of the counterweight assembly from a reference point within a coordinate system, and the determined status further including a determined weight of the counterweight assembly; and
a crane control system configured to determine a maximum load capacity of the crane based on the actual position of the counterweight assembly and the weight of the counterweight assembly determined by the optical control system.

2. The crane of claim 1, wherein the one or more image capture devices include a camera.

3. The crane of claim 1, wherein the determined status of the counterweight assembly further includes at least one of a configuration of the counterweight assembly and a specification of the counterweight assembly.

4. The crane of claim 1, wherein a weight unit of the one or more weight units includes a marker, and wherein the optical control system analyzes the detected one or more weight units to detect at least one of a shape of the weight unit, a color of the marker, and a pattern of the marker.

5. The crane of claim 4, wherein the optical control system further analyzes the detected one or more weight units to identify the detected one or more weight units as a known weight unit.

6. The crane of claim 5, wherein the optical control system retrieves additional information associated with the known weight unit, and the determined status is based on the additional information.

7. The crane of claim 5, wherein the optical control system counts a number of the detected on or more weight units that are identified as known weight units, and the determined status is based on the counted number of detected weight units.

8. The crane of claim 5, wherein the optical control system identifies a position of the detected one or more weight units within the captured image, and the determined status is based on the position of the detected one or more weight units within the captured image.

9. The crane of claim 1, wherein the crane control system is operably coupled to a crane component and configured to control or prevent movement of the one or more crane components based on the determined status.

10. The crane of claim 9, wherein the crane control system controls or prevents movement of the crane component based on the determined maximum load capacity.

11. An optical detection system for a crane having a movable or repositionable counterweight assembly repositionable to a plurality of positions for different lifting operations by linear movement or pivoting on an axis relative to the superstructure, the counterweight assembly comprising one or more weight units, the system comprising:
an image capture assembly comprising one or more image capture devices configured to capture an image of the counterweight assembly; and
an optical control system comprising a computer processor and a non-transitory computer-readable storage medium storing instructions, that when executed by the computer processor cause the optical control system to implement one or more functions to:
detect the counterweight assembly in the captured image;
analyze the detected counterweight assembly in the captured image;
determine a status of the counterweight assembly based on the analysis of the detected counterweight assembly in the captured image, the determined status including a determined position of the counterweight assembly, wherein the determined position of the counterweight assembly is an actual position of the counterweight assembly calculated based on an identified position of the detected counterweight assembly in the captured image, the actual position determined quantitatively as a distance of the counterweight assembly from a reference point within a coordinate system, and the determined status further including a determined weight of the counterweight assembly; and
determine a maximum load capacity based on the determined position of the counterweight assembly and the determined weight of the counterweight assembly.

12. The optical detection system of claim 11, wherein the optical control system analyzes the detected one or more weight units to identify the detected one or more weight units as one or more known weight units.

13. The optical detection system of claim 12, wherein the optical control system retrieves additional information associated the one or more known weight units, and the determined status is based on the additional information.

14. The optical detection system of claim 12, wherein the optical control system counts a number of the detected one or more weight units, and the determined status is based on the counted number of detected weight units.

15. The optical detection system of claim 12, wherein the optical control system identifies a position of the detected one or more weight units within the captured image, and the determined status is based on the position of the detected one or more weight units within the captured image.

16. A method of determining a status of a crane component comprising:
- capturing, with an image capture assembly, an image of a counterweight assembly movable or repositionable on a crane by linear movement or pivoting on an axis relative to a superstructure to a plurality of positions for different lifting operations, the counterweight assembly comprising one or more weight units;
- detecting, with an optical control system, the one or more weight units in the captured image;
- analyzing, with the optical control system, the detected one or more weight units in the captured image;
- determining, with the optical control system, a status of the counterweight assembly based on the analysis of the detected one or more weight units in the captured image, the determined status including an actual position of the counterweight assembly and a weight of the counterweight assembly; and
- determining a maximum load capacity based on the determined actual position of the counterweight assembly and the determined weight of the counterweight assembly,
- wherein determining the actual position of the counterweight assembly includes identifying, with the optical control system, a position of the detected counterweight assembly in the captured image and calculating, with the optical control system, the actual position of the counterweight assembly based on the identified position of the detected counterweight assembly in the captured image, wherein the determined actual position is a distance measurement from the counterweight assembly to a reference point within a coordinate system.

17. The method of claim 16, wherein the analyzing further comprises identifying the detected one or more weight units as one or more known weight units.

18. The method claim 17, wherein determining the status includes one or more of:
- retrieving additional information associated with the one or more known weight units, counting a number of the detected one or more weight units identified as one or more known weight units, and identifying a position of the detected one or more weight units within the captured image.

19. The method of claim 16, wherein the determined status of the counterweight assembly further includes at least one of a configuration of the counterweight assembly, and a specification of the counterweight assembly.

* * * * *

UNITED STATES PATENT AND TRADEMARK OFFICE
CERTIFICATE OF CORRECTION

PATENT NO. : 11,130,658 B2
APPLICATION NO. : 15/819234
DATED : September 28, 2021
INVENTOR(S) : Rudy et al.

It is certified that error appears in the above-identified patent and that said Letters Patent is hereby corrected as shown below:

In the Specification

In Column 9, Line 8, delete "the the counterweight" and insert -- the counterweight --, therefor.

In the Claims

In Column 15, Claim 7, Line 67, delete "on or more" and insert -- one or more --, therefor.

Signed and Sealed this
Seventeenth Day of May, 2022

Katherine Kelly Vidal
*Director of the United States Patent and Trademark Office*